(12) United States Patent
Moon et al.

(10) Patent No.: US 8,898,307 B2
(45) Date of Patent: Nov. 25, 2014

(54) SCHEDULING METHODS USING SOFT AND HARD SERVICE LEVEL CONSIDERATIONS

(75) Inventors: Hyun Jin Moon, Neward, CA (US); Yun Chi, Monte Sereno, CA (US); Vahit Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 81 days.

(21) Appl. No.: 13/525,308

(22) Filed: Jun. 16, 2012

(65) Prior Publication Data

US 2013/0166750 A1      Jun. 27, 2013

Related U.S. Application Data

(60) Provisional application No. 61/537,899, filed on Sep. 22, 2011.

(51) Int. Cl.
| | | |
|---|---|---|
| G06F 15/173 | (2006.01) |
| G06F 9/46 | (2006.01) |
| G06Q 10/00 | (2012.01) |
| G06Q 40/00 | (2012.01) |
| H04L 12/24 | (2006.01) |
| H04L 29/06 | (2006.01) |
| H04W 72/08 | (2009.01) |
| H04L 5/00 | (2006.01) |
| H04W 72/12 | (2009.01) |
| H04W 84/04 | (2009.01) |

(52) U.S. Cl.
CPC ........ *H04L 41/5019* (2013.01); *H04L 41/5003* (2013.01); *H04L 41/5009* (2013.01); *H04L 29/06523* (2013.01); *H04W 72/082* (2013.01); *H04L 5/0007* (2013.01); *H04L 5/0058* (2013.01); *H04L 5/0085* (2013.01); *H04W 72/1231* (2013.01); *H04W 84/045* (2013.01)
USPC ............. 709/226; 718/104; 705/7.28; 705/28

(58) Field of Classification Search
CPC ............ H04L 41/5009; H04L 41/5003; H04L 29/06523; H04L 29/06
USPC ......................................................... 709/226
See application file for complete search history.

(56) References Cited

U.S. PATENT DOCUMENTS

| | | | |
|---|---|---|---|
| 2003/0018513 A1* | 1/2003 | Hoffman et al. | 705/10 |
| 2008/0320482 A1* | 12/2008 | Dawson et al. | 718/104 |
| 2012/0066020 A1* | 3/2012 | Moon et al. | 705/7.28 |

* cited by examiner

*Primary Examiner* — Kevin Bates
*Assistant Examiner* — Emad Siddiqi
(74) *Attorney, Agent, or Firm* — Joseph Kolodka

(57) ABSTRACT

A computer implemented method of workload scheduling under two different types of Service Level Agreements (SLAs), namely soft and hard SLA which employ both a deadline- and cost-aware scheduler called iCBS-DH. The scheduler is evaluated against deadline and cost performance of various scheduling policies under a large range of SLA cost function and deadline types.

1 Claim, 20 Drawing Sheets

SCHEDULING METHODS USING SOFT AND HARD SERVICE LEVEL CONSIDERATIONS

CROSS REFERENCE TO RELATED APPLICATION

This application claims the benefit of U.S. Provisional Patent Application Ser. No. 61/537,899, entitled "Scheduling Performance Evaluation for Database Workloads with Soft and Hard SLAs" and filed Sep. 22, 2011 which is incorporated by reference as if set forth at length herein.

TECHNICAL FIELD

This disclosure relates generally to the field of computing and communications and in particular to methods and systems that provide real-time service delivery subject to service-level agreements between customers and service provider(s).

BACKGROUND

Given the ever-increasing capacity demands made on cloud computing resources, service providers have employed service level agreements (SLAs) which formally define the level of service provided to a customer by the service provider. More particularly, an SLA oftentimes records a common understanding about services, priorities, responsibilities, guarantees and warranties with respect to availability, serviceability, performance, operation or other attributes of the service offered by the service provider to the customer. Given their importance in the industry, methods that provide abilities to more effectively manage services provided under such SLAs, would be a welcome addition to the art.

SUMMARY

An advance in the art is made according to an aspect of the present disclosure directed to a scheduling method that minimizes both SLA cost and deadline violations. The methods—which we describe as Cost Based Scheduling with Deadline Hint (iCBS-DH)—advantageously minimizes both SLA cost and deadline violations. Operationally, a method according to an aspect of the present disclosure extends a cost based scheduler (iCBS) by adding a specifically chosen parameter—named deadline hint.

According to an aspect of the present disclosure, such method will first minimize the SLA cost agreed to by the service provider and customer. Since SLA cost oftentimes translates into monetary penalty, a method according to the present disclosure will minimize operational cost.

Next the method minimizes any violation of response time deadline—which is often internally defined for service quality assurance. As may be appreciated, the violation of response time deadline may be employed for all service users to meet internally posed performance goal(s) for all jobs (e.g., worst case quality control), or a subset of service users (e.g., VIPs), or a subset of workload queries (e.g., time-sensitive jobs). Advantageously, our method allows service providers to flexibly configure internal deadlines as above, thereby ensuring high quality service by minimizing the violations.

Finally, our method employs a single tunable parameter—deadline hint cost—that allows a tradeoff between the two conflicting goals of SLA cost minimization and deadline violation minimization. Advantageously, methods according to aspects of the present disclosure are particularly well suited for application to database and other cloud-based services.

BRIEF DESCRIPTION OF THE DRAWING

A more complete understanding of the present disclosure may be realized by reference to the accompanying drawings in which.

DETAILED DESCRIPTION

Figure 1:
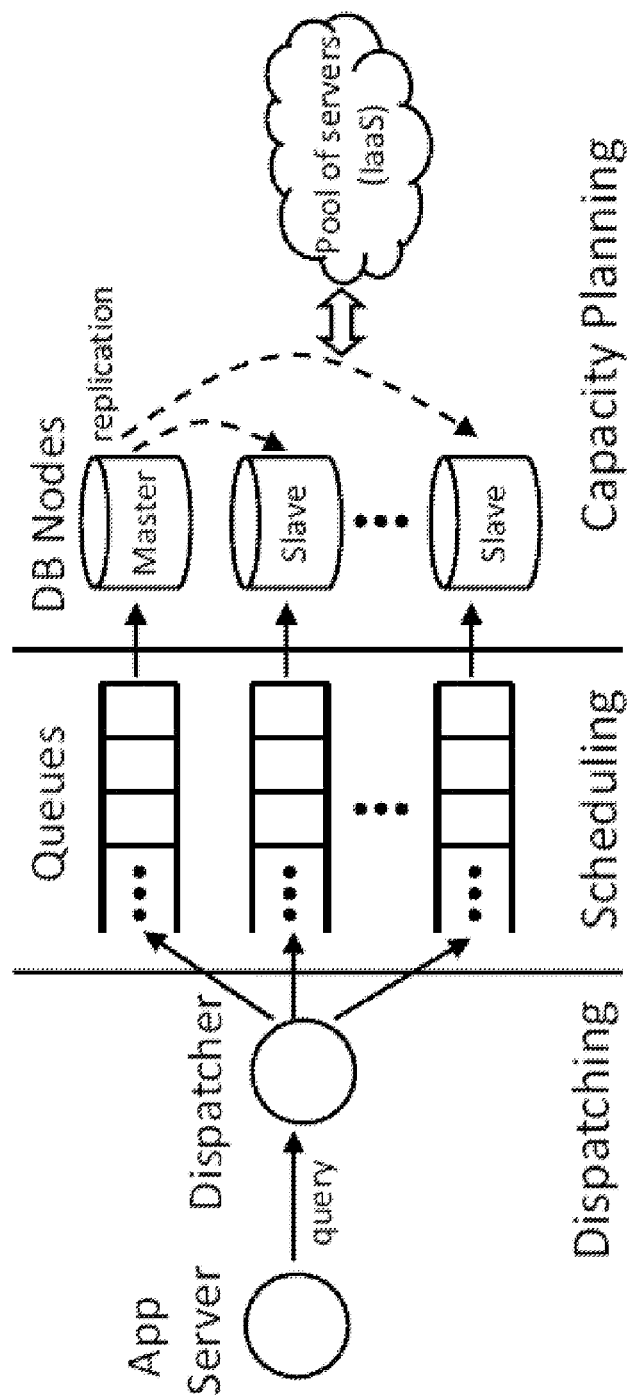
FIG. 1 is a graphical conceptual system diagram depicting an intelligent cloud database coordinator (ICDS) according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we note that cloud computing has emerged as a promising computing and business model. By providing on-demand scaling capabilities without any large upfront investment or long-term commitment, cloud computing is attracting a large variety of applications.

Accordingly, the database community has also shown great interest in exploiting this new platform for data management services in a highly scalable and cost-efficient manner.

Cloud computing presents many challenges and opportunities for data management services. For instance, database service providers may experience a number of heterogeneous customer workloads having widely varying characteristics. To serve such workloads, service providers may have to employ a diverse set of specialized database products and technologies to ensure that customers obtain the benefits of those products specifically tailored for their needs.

With such motivation, the inventors of the present application are constructing a data management platform in the cloud, called CloudDB at NEC Labs. One important component of the CloudDB is the Intelligent Cloud Database Coordinator (ICDC), which is responsible for all functions and decisions regarding work, namely load dispatching, workload scheduling, and resource capacity planning, as shown in FIG. 1.

With reference to that FIG. 1, it may be understood by those skilled in the art that when a query arrives, ICDC first estimates its query execution time, based on workload history and appropriate prediction techniques. At this point, we note that the term query and job are used interchangeably herein. We also note that with respect to query execution time, one may estimate the low-level resource demand of individual queries (e.g., CPU, I/O, and memory) and manage scheduling, dispatching, and capacity based on that. Notwithstanding, this disclosure and underlying methods and systems employ a higher level approach based on execution time—an approach that we believe is more manageable yet effective.

Returning to our discussion, when a query arrives a dispatcher immediately assigns the query to one of the servers, according to a dispatching policy and therefore places the query into a queue. At each server, a scheduling policy decides which query should be executed first from the scheduling queues.

As may be appreciated, the capacity planning component is in charge of determining how many resources (i.e., database servers) are allocated to the system. The capacity planner is aware of the status of the resource scheduler and that of the query dispatcher and uses them in capacity planning decisions. While all of these three components are important for ICDC, in this disclosure we focus on the workload scheduling aspect of ICDC.

Notably, in order to effectively manage and control CloudDB, a database service offering, ICDC focuses on Service Level Agreements (SLAs) and the service provider's revenue as the two main metrics to optimize. This is in sharp contrast to other low-level system metrics such as average response time or system throughput which are the subject of any of a number of contemporary optimization strategies.

During the design of our system, we have collected specific requirements for the scheduling framework which are as follows:

Service providers' profit should be the main metric of optimization.

There should be a capability to model and manage SLAs that translate varying levels of service quality into service providers' profit or penalty, e.g. a step function, which we refer to as soft SLA in this paper.

There should be a capability to define a separate service level objective (i.e. termed hard SLA in this paper) for some or all of the jobs in addition to the soft SLAs above: it is highly desired to meet the hard SLA, while its violation may or may not have direct monetary penalties.

The system should be able to manage the SLAs at the finest granularity level, i.e., per job basis, as opposed to coarser granularity levels, such as a percentile basis.

The system should be able to support multiple users, who share the same system resources, with multiple job classes, and multiple SLA definitions corresponding to those job classes.

The complexity of the scheduling framework should be sub-linear, such as O(log n) to cope with a high job arrival rate or bursts in the real system.

As will become apparent, the present disclosure is directed to a scheduling framework and accompanying method(s) that advantageously fulfill these above-stated requirements.

According to an aspect of the present disclosure then, we consider two types of SLAs, namely soft SLAs and hard SLAs.

A soft SLA describes SLA profit as a function of response time. For example, a job that incurs no penalty for a service provider if it finishes within 500 ms and $1 penalty otherwise. As there are a number of users in the system with individual SLAs, the service provider may choose to serve the jobs from different users at varying levels instead of trying to serve them equally to optimize the profit.

A hard SLA specifies a single firm deadline objective for each job. The objective is defined either by the user or the service provider. The violation of the objective may (e.g., direct penalty or change back) or may not (e.g., poor user experience, bad company image) have direct monetary consequences. While some systems have only one of these two SLA types, we consider the case where the two co-exist, which is the case for our system. We seek to manage both SLA profit under soft SLAs and the deadline violation count under hard SLAs.

As will become apparent to those skilled in the art, the present disclosure is directed to a Dual-SLA problem namely the identification and formalization of both profit and deadline violation management under both soft and hard SLAs.

In providing such management, our scheduler employs a scheduling policy we have called iCBS-DH—which is an extension of a cost-aware scheduler (cost based scheduler—CBS) that we have advantageously added a deadline hint (DH).

SLA and Profit Models

A. Service Level Agreements

SLAs in general may be defined in terms of various criteria, such as service latency, throughput, consistency, security, etc. In this disclosure, we primarily focus on service latency, or response time. Even for the response time alone, there can be different specification methods based on, for example, i) the average query response time, ii) the tail distribution of query response time, or iii) the individual query response time. As noted previously in the requirements presented herein, we are primarily concerned with the latter. For each specification method, we can also design SLA either as a soft SLA or a hard SLA as follows.

Figure 2:
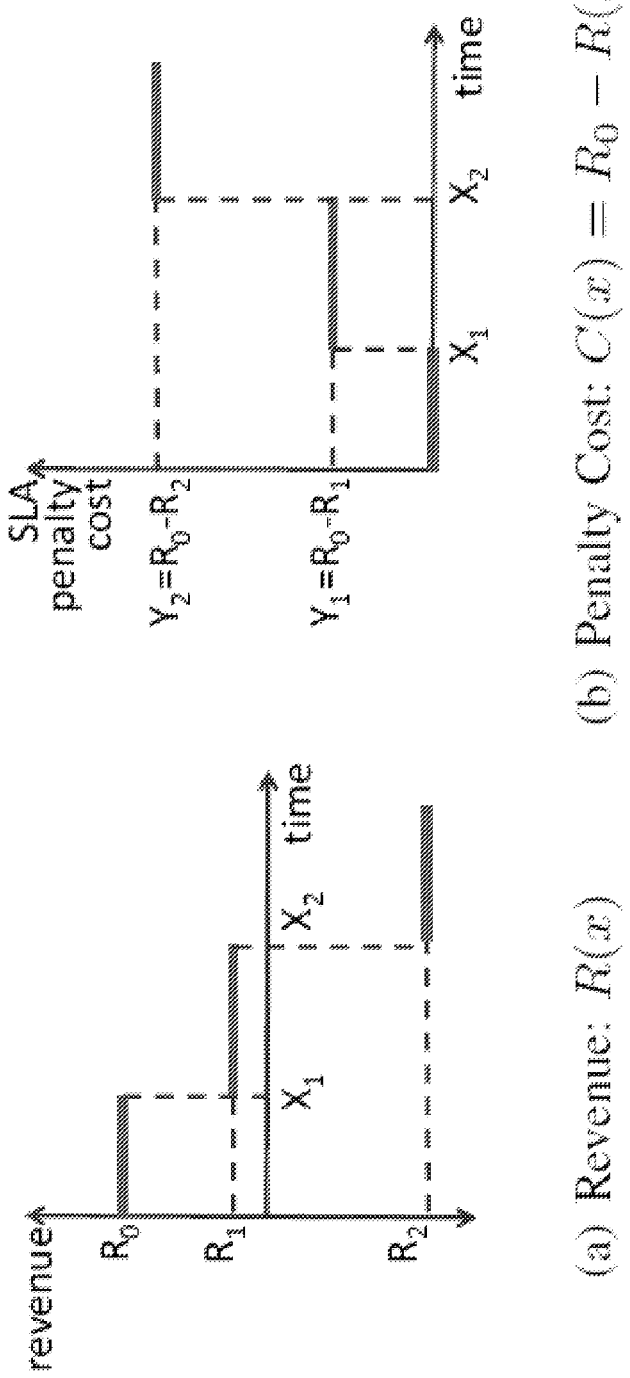
FIG. 2 is a schematic diagram depicting SLA revenue and penalty cost functions as: a) Revenue R (x); and b) Penalty Cost C (x)=$R_0$–R(x); according to an aspect of the present disclosure.

Soft SLA: A soft SLA corresponds to agreed upon levels of service in the SLA contract. An SLA penalty (cost) function may have various shapes, such as a linear function, a stepwise function, piecewise linear function, or any general curve. We believe that the stepwise function shown in FIG. 2(a) is one of the most natural choices for real world contracts since it is easy to be described in a natural language. In the SLA revenue function shown in FIG. 2(a), the client may pay: i) $R_0$ if the corresponding query finishes within $X_1$; ii) $R_1$ if the query finished between $X_1$ and $X_2$, or iii) $R_2$ if the query response time is more than $X_2$.

Hard SLA: A hard SLA has a single hard deadline to meet, and if the deadline is missed, it is counted as a violation. The specification of this type of SLAs (also referred to as constraints in this paper) may come from the client or the cloud service provider. For example, there are cases where a cloud provider needs to use hard SLAs as a tool to control various business objectives, e.g., controlling the worst case user experience. Therefore the violation of a hard SLA does not necessarily correspond to direct financial terms in the client contracts.

B. Profit Model

In an exemplary system operating according to aspects of the present disclosure, multiple clients are supported, where each client has its own database and an independent workload. Each client has one or more job classes, where each job class has a common SLA, shared by all jobs in the job class.

Given the SLA revenue function, R(x), defined as above, we derive the SLA penalty cost function, C(x), as:

$$C(x) = R_0 - R(x)$$

An example is shown in FIG. 2(b). Note that profit maximization based on R(x), which is one of our objectives, is equivalent to minimizing SLA penalty cost based on C(x). Accordingly, the disclosure that follows focuses on the minimization of C(x).

Scheduling Policies

In this section, we introduce various scheduling policies we evaluate in developing the methods and systems of the present disclosure.

A. Cost- and Deadline-unaware Scheduling

1) FCFS: First-Come First-Served. This is the most popular type of scheduling policy, where jobs are executed in the order of arrival.

2) SJF: Shortest Job First. Among the jobs in the queue, the one with the shortest execution time (i.e. service time) is scheduled. Once scheduled, the job runs to finish without preemption. SLA cost function or deadline information is not used for the scheduling decision.

B. Deadline-Aware Scheduling

1) EDF: Earliest Deadline First. The job with the earliest deadline is executed first. SLA cost function is not used for the scheduling decision.

2) AEDF: Adaptive EDF, tries to avoid the weakness of EDF, which is the domino effect under the overload situation. It doesn't use SLA cost function information or execution time information.

C. Cost-aware Scheduling

1) BEValue2: A scheduling algorithm that uses SLA cost function information, but not the deadline: they use the term deadline to refer to the time where the cost increases dramatically, similar to our cost step time, and it is different from our deadline, which does not have any explicit cost associated. BEValue2 is a modified version of EDF that addresses EDF's weakness at overload. It also exploits execution time information.

2) FirstReward: A scheduling algorithm that is a highly sophisticated scheduling policy considering benefit and opportunity cost of each scheduling choice, each scheduling has a high overload of $O(n^2)$, where n is the number of jobs in the queue. iCBS (below) avoids this problem. FirstReward uses SLA cost function information and execution time information, but not the deadline.

3) iCBS: Peha and Tobagi have proposed a heuristic-based cost-based scheduling policy, called CBS which has superior performance in terms of query cost minimization. The high level idea is to first re-evaluate the priorities of all jobs in the queue at the moment when a scheduling decision is needed and then pick the query with the highest priority, at that given moment, which in turn maximizes the expected global total profit.

To evaluate the priority of job i, CBS considers two possible cases: i) the job is chosen to be scheduled now, or ii) some other job is chosen. The former case will incur a cost of $c_i(t)$ to the job i, where $c_i(t)$ is the cost function of job i and t is the time job i has been staying in the queue so far. For the case ii, it is assumed that the job gets delayed by an additional wait time, $\tau$ before it is served, which will result in a cost of $c_i(t+\tau)$. Since the value of $\tau$ is not known, CBS uses a probability density function of $\tau$, $a(\tau)$, and compute the expected cost using it. Based on these two scenarios, the CBS priority for a job i is defined as:

$$p_i(t) \int_0^\infty a(\tau) \cdot c_i(t+\tau) dt - c_i(t)$$

After the $p_i(t)$ is computed, it is then divided by the job's service, since longer jobs occupy the server for a longer time, delaying other jobs for a longer time. CBS chooses the job with the highest priority among all jobs in the queue.

In general, it is difficult to find an optimal $a(\tau)$, but we may show that the exponential function $a(\tau)=1/\beta \cdot e^{-\tau/\beta}$, works well in practice. Experimentally it is shown that the quality of CBS is not particularly sensitive to the value of $\beta$.

CBS has a time complexity of $O(n)$, where n is the number of job in the queue. This is because CBS examines all the jobs in the queue in order to pick the one with the highest priority. In real systems where queues can grow arbitrarily long and job service time can be very short $O(n)$ may not be acceptable. To address this problem, a CBS variant—iCBS—has been proposed which incrementally maintains CBS priority score and keeps the scheduling overhead at $O(\log^2 n)$.

C. Cost- and Deadline-aware Scheduling 1) iCBS-DH: While CBS and iCBS considers the SLA cost function and tries to minimize the cost, they cannot support additional deadlines. In this section, we discuss how we extend iCBS into iCBS-DH, to address this problem.

Figure 3:
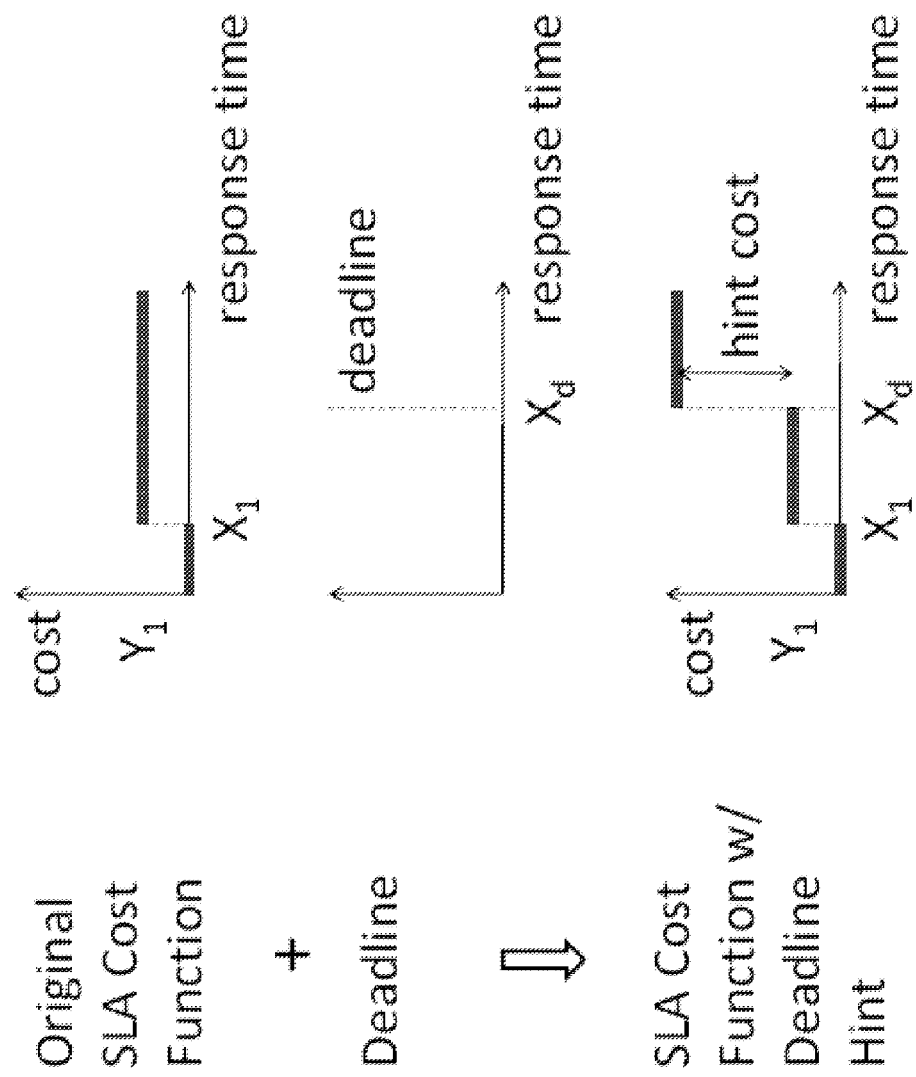
FIG. 3 is a schematic diagram depicting an Original SLA Cost Function+Deadline and SLA Cost Function w/Deadline Hint (iCBS with Deadline Hint) according to an aspect of the present disclosure.
Figure 4A:
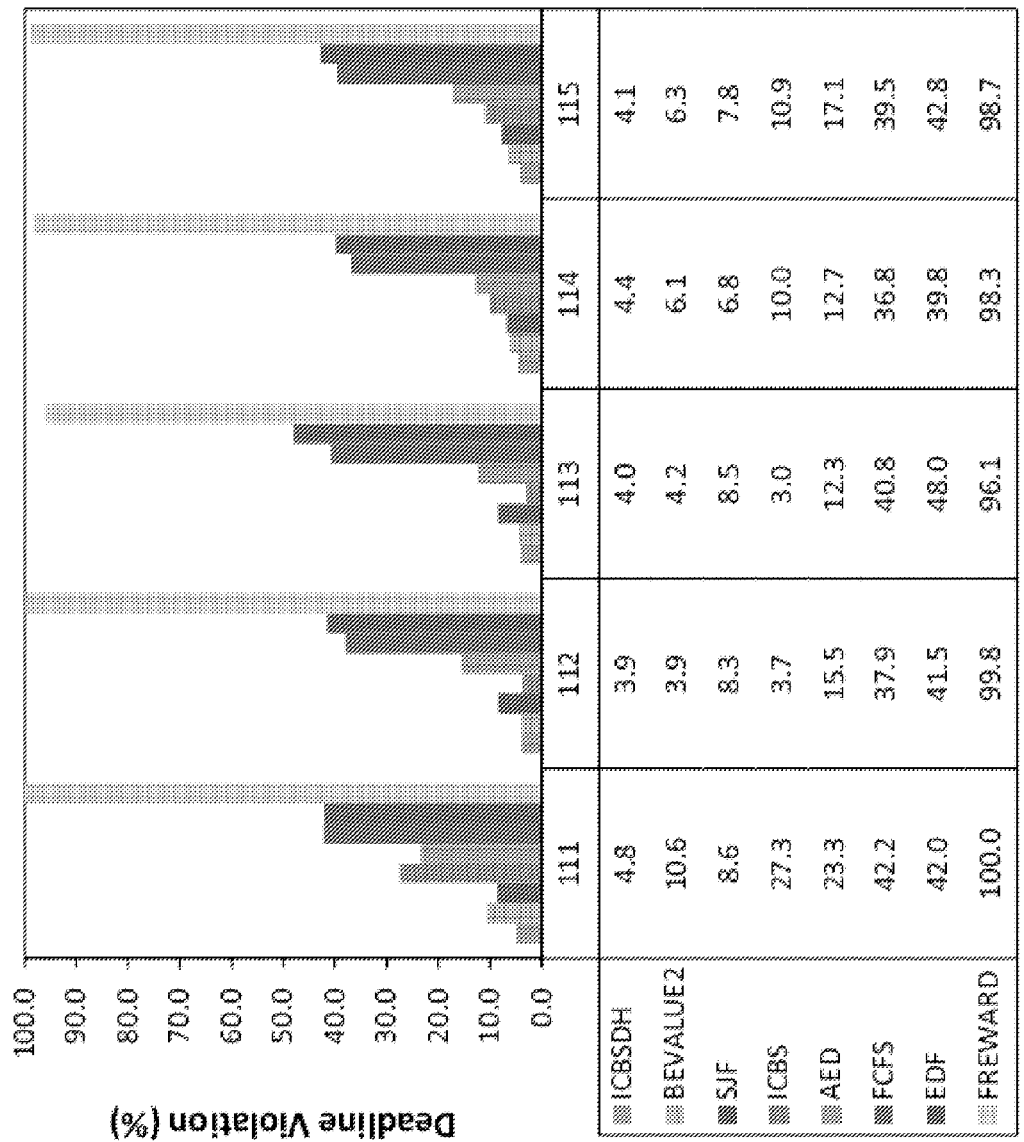
FIG. 4(a) and FIG. 4(b) are graphs depicting the performance of scheduling policies under varying SLA cost functions and deadlines showing a) Deadline violations and b) SLA cost; according to an aspect of the present disclosure.
Figure 4B:
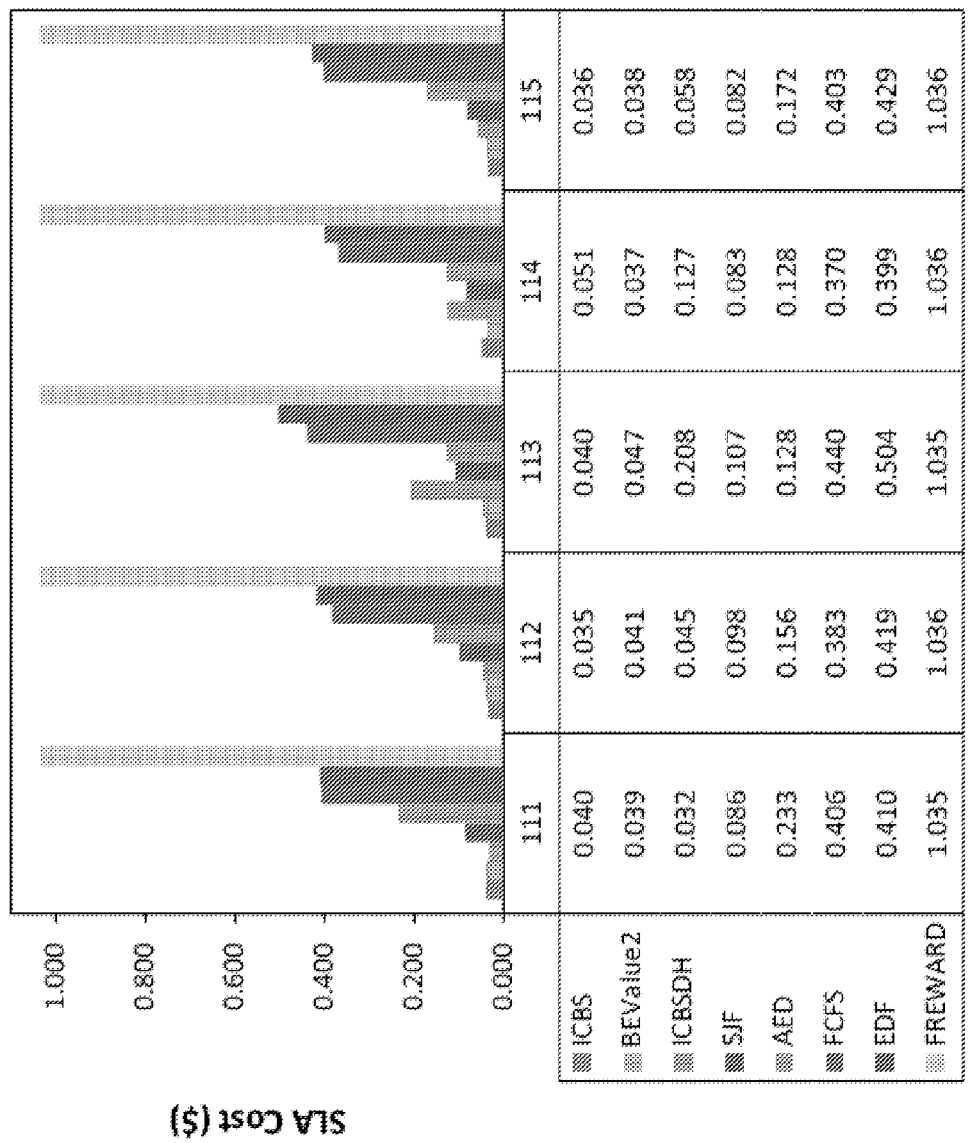
Figure 5A:
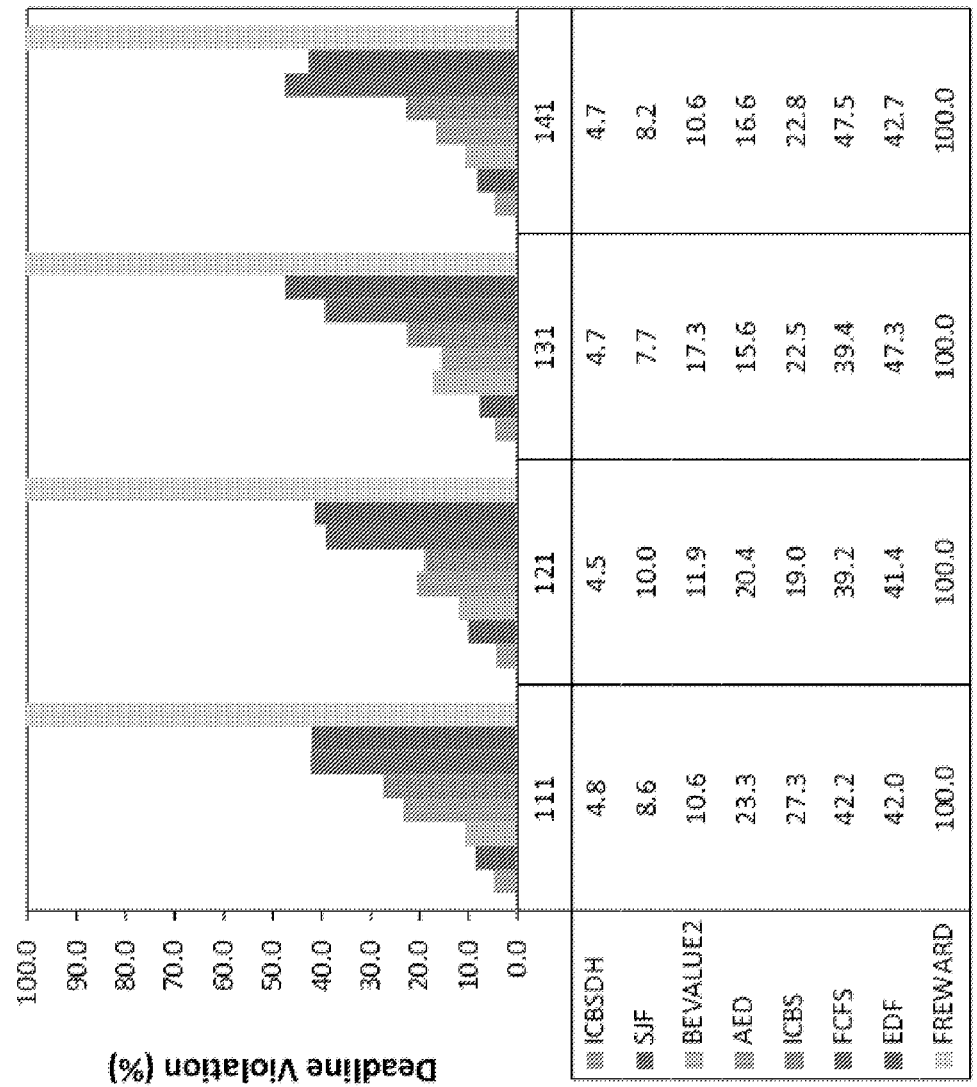
FIG. 5(a) and FIG. 5(b) are graphs depicting the performance of scheduling policies under varying SLA cost functions and deadlines showing a) Deadline violations and b) SLA cost; according to an aspect of the present disclosure.
Figure 5B:
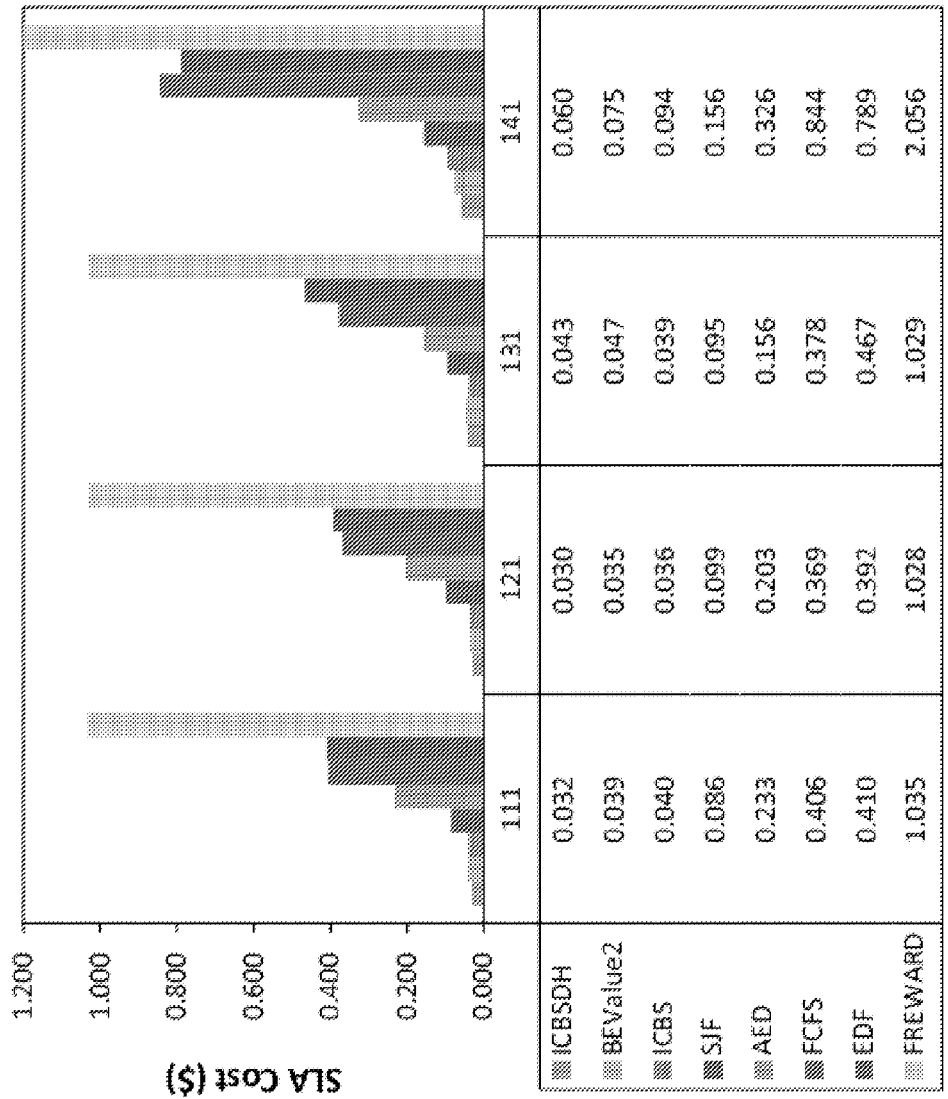
Figure 6A:
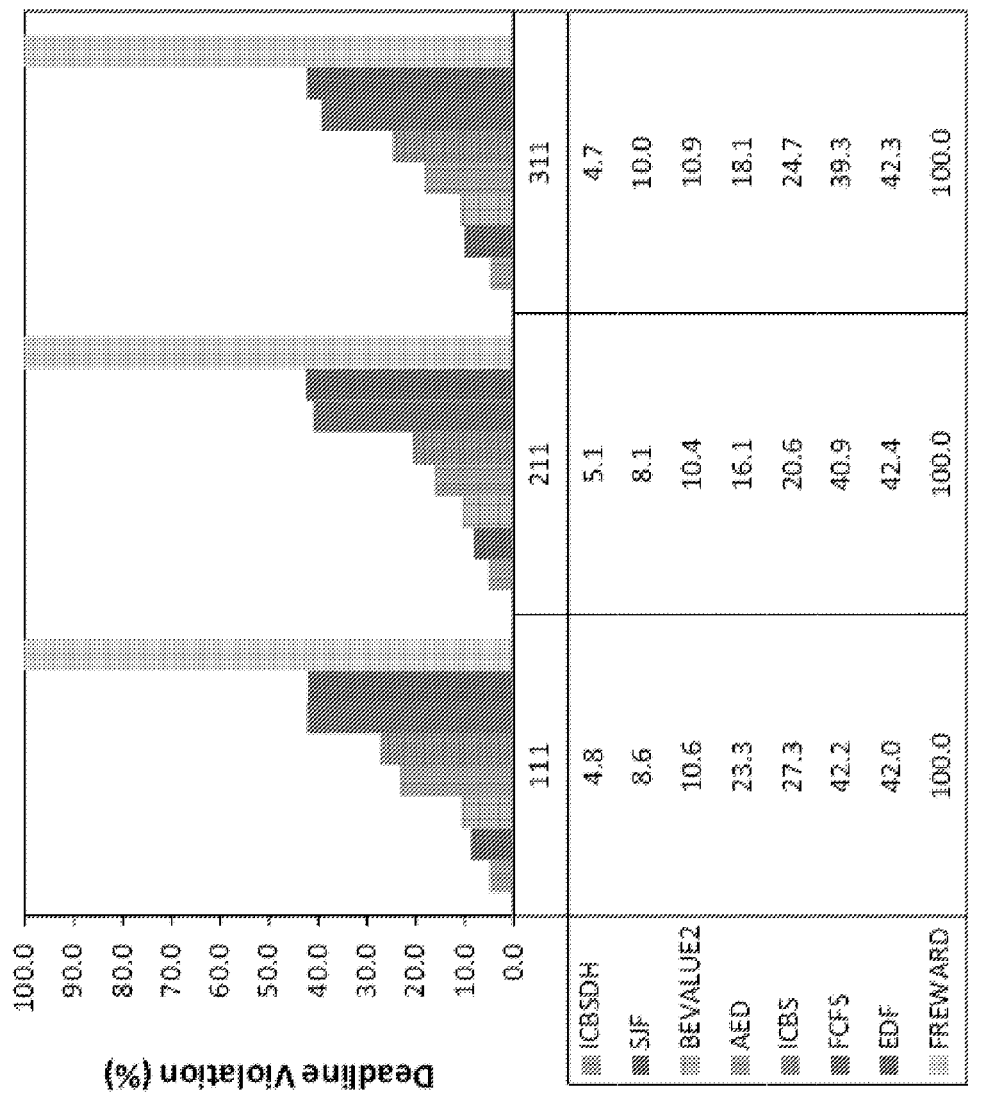
FIG. 6(a) and FIG. 6(b) are graphs depicting the performance of scheduling policies under varying SLA cost functions and deadlines showing a) Deadline violations and b) SLA cost; according to an aspect of the present disclosure.
Figure 6B:
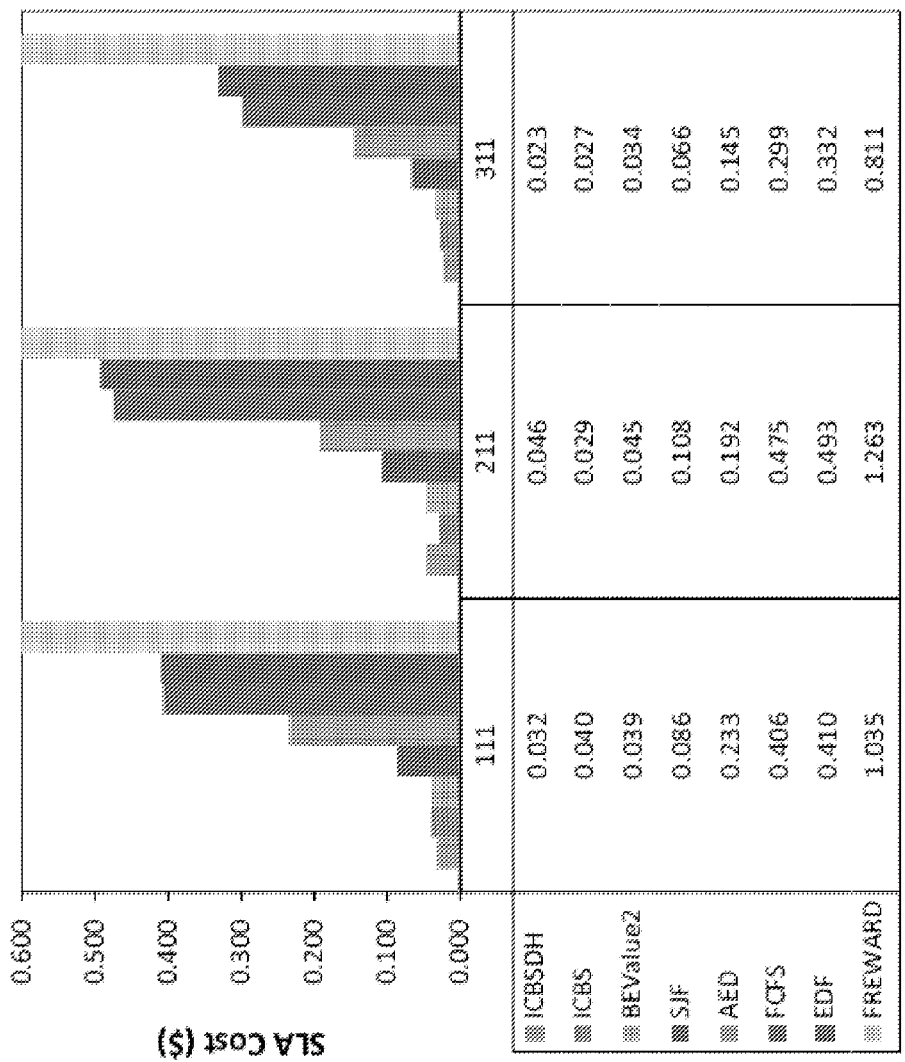

In general one may modify the scheduling method and come up with a constraint-conscious scheduling. In this disclosure, we avoid this option, and choose to use iCBS as is. Instead, we modify the SLA cost function, to tell iCBS to make constraint-conscious scheduling decisions: for each job, we add an artificial cost step at the deadline, so that the iCBS scheduling will respect an extra cost step and try to meet the deadline, using its cost-minimizing scheduling algorithm. This is illustrated in FIG. 3. We call this scheduling method, iCBS-DH (i.e. deadline hint). Note that we introduce one parameter for iCBS-DH, which is the cost for the deadline hint. The hint cost value affects the importance of the deadline: high hint cost will make the deadline a high priority, compared to the regular cost steps, and vice versa. We experimentally evaluate the performance of iCBS-DH and the effect of the deadline hint cost below.

Evaluation

A. Setup

To evaluate the methods according to the present disclosure, we use MySQL 5.5, populated with TPC-W 1 GB dataset. We use six queries obtained from the TPC-W benchmark. The server machine has Intel Xeon 2.4 GHz, two single-core CPUs. It has 16 GB memory, where 1 GB is used for MySQL bufferpool. The client machine has Xeon 2.4 GHz, two quad-core CPUs. The client code is written in Java.

To evaluate, we run open-system workload, wherein new queries arrive at the system queue, independent of finishing of existing jobs. We vary the arrival rate as discussed below, to control the system load, and use Poisson distribution. 85% system load is used as the default, unless otherwise mentioned.

Query Execution Time Estimate Some scheduling policies, i.e. SJF, FirstReward, BEValue2, iCBS, iCBS-DH, rely on the query execution time estimates for their scheduling decisions. In our experiments, we use a simple, but highly effective method for per-template execution time estimation, as follows. For each query type, we maintain the mean and the standard deviation (SD) of query execution times. From these measurements, we use mean+SD as the estimate, which worked well across different load and MPL levels.

SLA Cost and Deadline In order to evaluate scheduling algorithms against various SLA and deadlines, we create the following experiment parameters: cost density type, cost step type, deadline type. Table I shows the specific values for individual query types used for the experiment. For instance, with CostDensity=1, CostStepTime=3, Deadline=1, Q1 will have \$3/msec as the cost density (i.e. one cost step with \$3/msec×0.23msec=\$0.69), the cost step time at 30 msec after the query arrival, the deadline at 10 msec after the query arrival. We call this case as SLACostDeadlineCode=131, which is the concatenation of CostDensity, CostStepTime, and Deadline codes.

Note that different queries may get different SLA cost or deadlines under the same SLACostDeadlineCode=131: e.g. under SLACostDeadlineCode=131 of above, Q2 will get cost step time of 15 msec after the query arrival, different from Q1. One special case to note is CostStepTime=4, i.e. 20–4. In this case, there are two cost steps, as in the example of FIG. 2(b). Queries have the first cost step at 20 msec, and the second one at 40 msec. The first cost step has the cost density multiplied by the ExTime as its cost, and the second step gets the twice cost of that. Lastly, empty cells indicate the combinations that are not used in our experiments, e.g. Q6 with CostDensity=1.

We use uniform distribution of five query types (i.e. Q1 through Q5) in all experiments unless otherwise mentioned. Individual experiment runs for 5 seconds[4], and we report the average of five repeats for each data point.

Scheduling Policy Parameters iCBS uses $\beta=1$ msec and iCBS-DH uses hint cost of \$1000.

B. Results

1) Varying SLA and Deadlines: FIGS. 4(a), 4(b), 5(a), 5(b), and 6(a), 6(b) show the experiment results for eight scheduling policies under varying SLA cost function and deadlines. With the default CostDensity=1, CostStepTime=1, and Deadline=1, we vary Deadline in FIG. 4 (i.e. SLACostDeadlineCode=11x), Cost-StepTime in FIG. 5 (i.e. SLACostDeadlineCode=1x1), and CostDensity in FIG. 6 (i.e. SLACostDeadlineCode=x11).

Highlights on deadline violations are as follows: i) for deadline violation, iCBS-DH performs the best, keeping the violation at 5.1% or lower in all cases. SJF, BEValue2, iCBS, and AED follow the next. Note that their deadline performance fluctuate depending on the SLA cost function shape and deadline. ii) FCFS and EDF have rather high deadline violation at around 40%. Both are vulnerable to (temporary) overloads, causing domino effects, and they run queries even when they already missed the deadline. iii) FirstReward misses almost all deadlines, due to its high scheduling overhead of $O(n^2)$.

What follows now is the summary on SLA cost performance: i) iCBS achieves minimum SLA cost in most cases. Compared with FCFS, the most popular and simple scheduling, SLA cost is reduced by the factor of 10. ii) BEValue follows iCBS, very closely in some cases, and with the factor of 2, in some cases. iCBS-DH, SJF, AED comes next. Note that iCBS-DH has a fluctuating cost performance over different SLACostDeadlineCode: when deadline observance helps SLA cost (e.g. code 111, 112), iCBS-DH cost is as low as that of iCBS. When deadline observance does not necessarily help SLA cost (e.g. code 113), iCBS-DH cost is rather high. iii) FCFS, EDF, and FirstReward incur high SLA cost for the same reason mentioned in deadline violations.

Figure 7A:
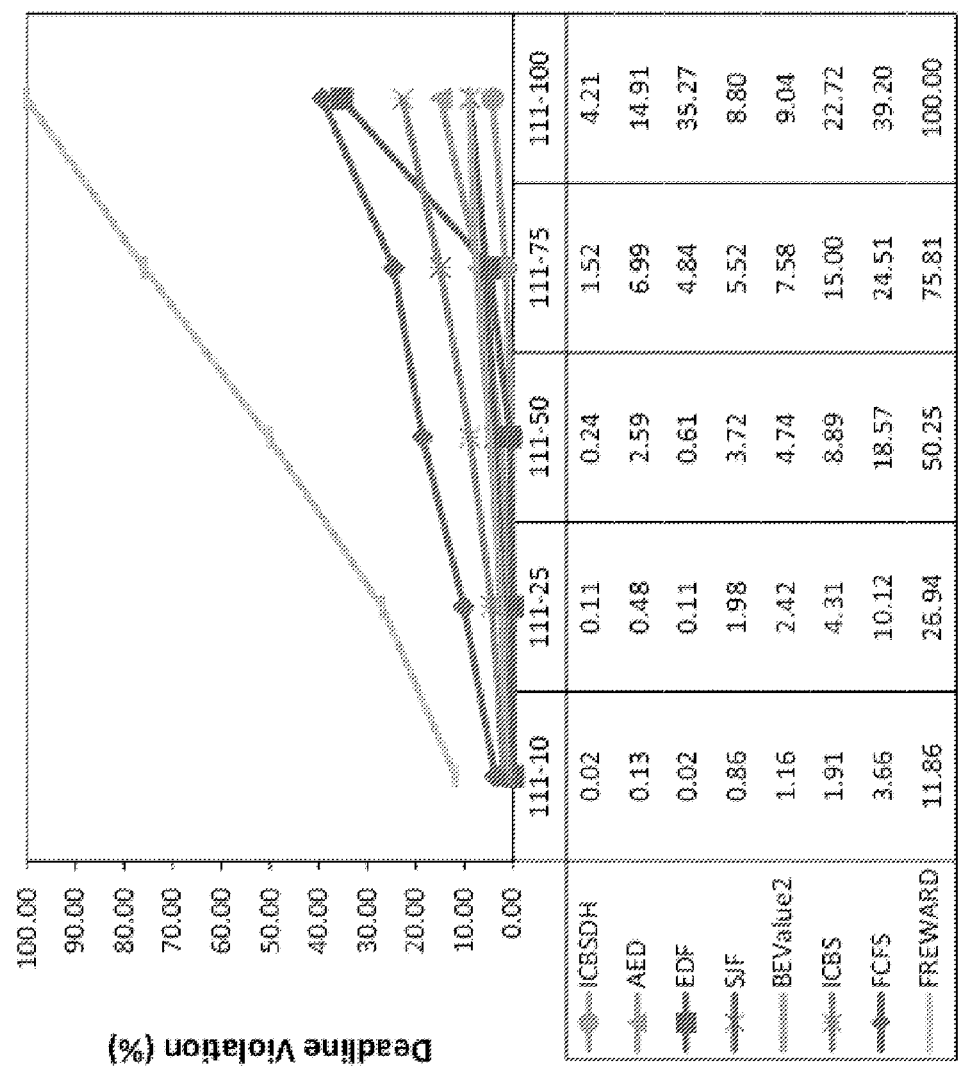
FIG. 7(a) and FIG. 7(b) are graphs depicting the performance of scheduling policies under varying percentages of deadline-having queries showing a) Deadline violations and b) SLA cost; according to an aspect of the present disclosure.
Figure 7B:
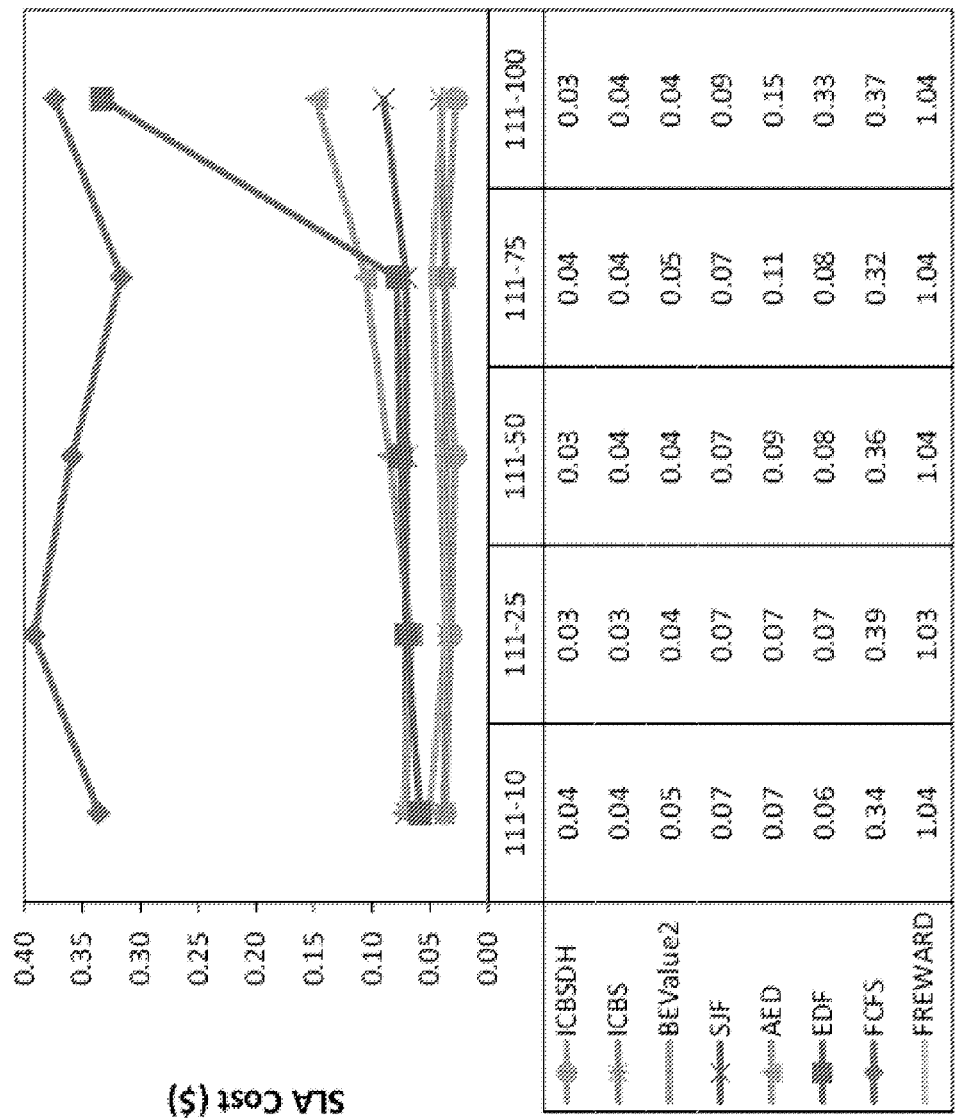

2) Varying Deadline Portion: Depending on the business requirements, only a portion of queries may have hard deadlines. For example, 25% of all queries are very important queries and have a deadline, while the others are best effort. We study the scheduling performance where a subset of queries have a deadline (e.g. 10, 25, 50, 75, 100%), and report the result in FIGS. 7(a), and 7(b). Deadline violation percentage on the y-axis reports the percentage out of all jobs.

Highlights on deadline performance are as follows: i) iCBS-DH consistently performs the best in most of the cases. ii) EDF performs as well when 50% or less jobs have deadlines, where no (temporary) overload causes a domino effect. With 75% or higher jobs having deadline, however, EDF is hit by the problem and gets very high deadline violations. For cost performance, note that EDF has a similar behavior as in deadline performance mentioned above. iCBS-DH achieves low SLA cost, comparable to that of iCBS, when the portion of deadlined jobs is 25% or lower. This is a nice adaptive feature that iCBS-DH gives just enough attention for the deadline satisfaction, and puts its effort on cost reduction like iCBS.

Figure 8A:
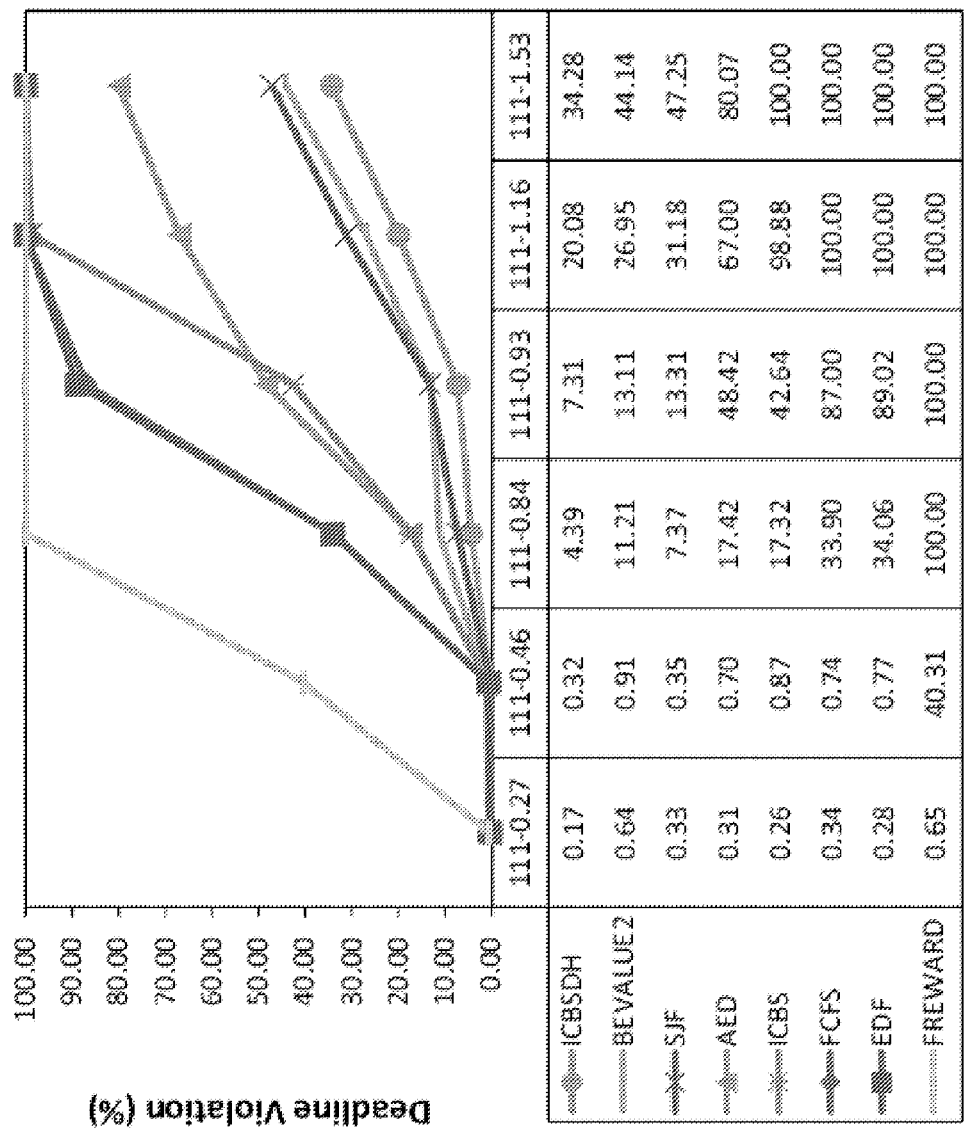
FIG. 8(a) and FIG. 8(b) are graphs depicting the performance of scheduling policies under varying load showing a) Deadline violations and b) SLA cost; according to an aspect of the present disclosure.
Figure 8B:
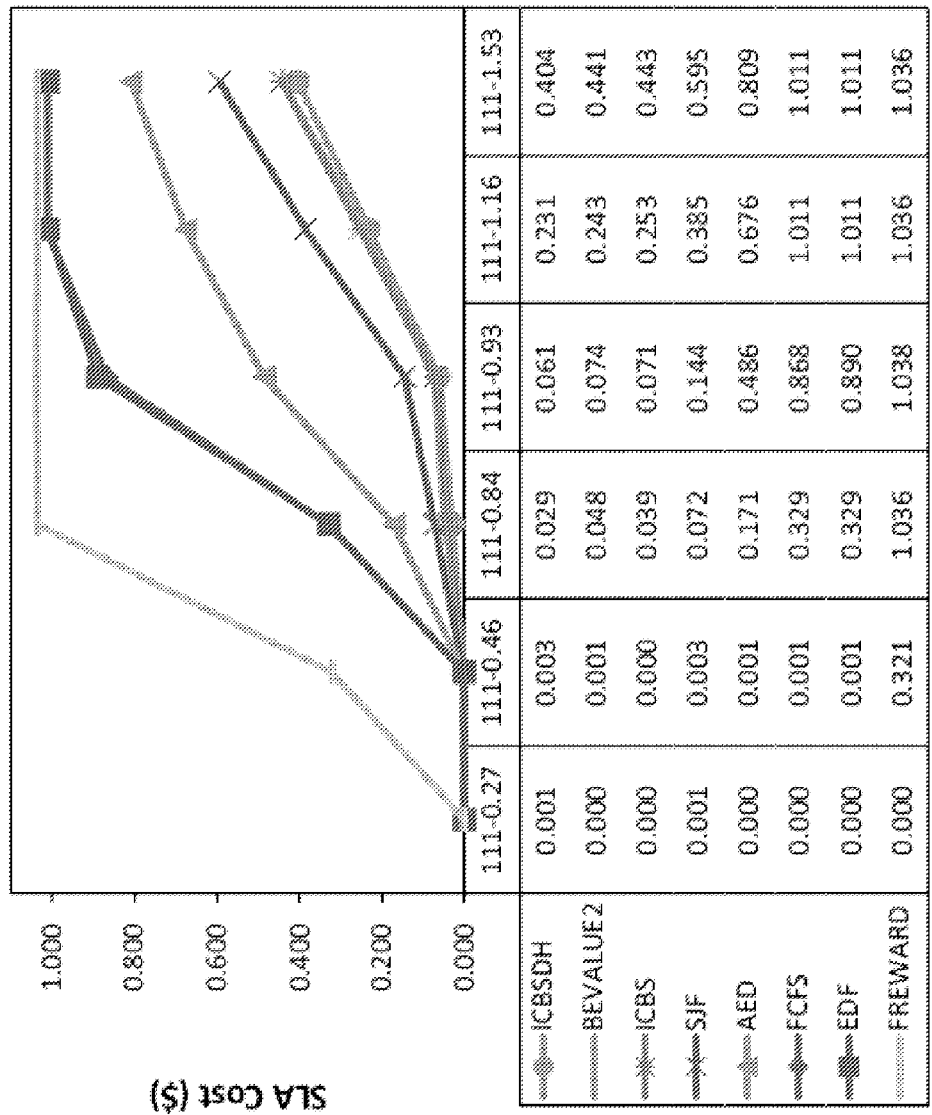

3) Varying Load: FIGS. 8(a), and 8(b) shows the performance under varying load levels, in the range from a low load, i.e. 27%, to an overload, i.e. 153%. For deadline violation, iCBS-DH again performs the best across all load range. BEValue2 and SJF comes close to iCBS-DH, while iCBS, AED, FCFS, EDF, FirstReward has high violations for the reasons mentioned above.

For cost performance, iCBS and BEValue2 are consistently the best. While iCBS-DH shows a good cost performance in FIG. 8(b) with SLACostDeadlineCode=111, in general it has a varying performance: when meeting deadline helps cost, e.g. code 111 and 112, it performs well on cost, and otherwise not (e.g. code 113).

4) Varying MPL: In the real-world database systems, it is rarely the case that one query runs at a time. Instead, multiple queries are run concurrently to exploit parallelismin the computing resources, such as CPU and IO. We vary the concurrency level, also known as multi-programming level (MPL) between 1 and 32, and observe the performance behavior of scheduling policies. We choose different arrival rates under different MPL, so that we achieve about 85% system load in all MPL cases.

Figure 9A:
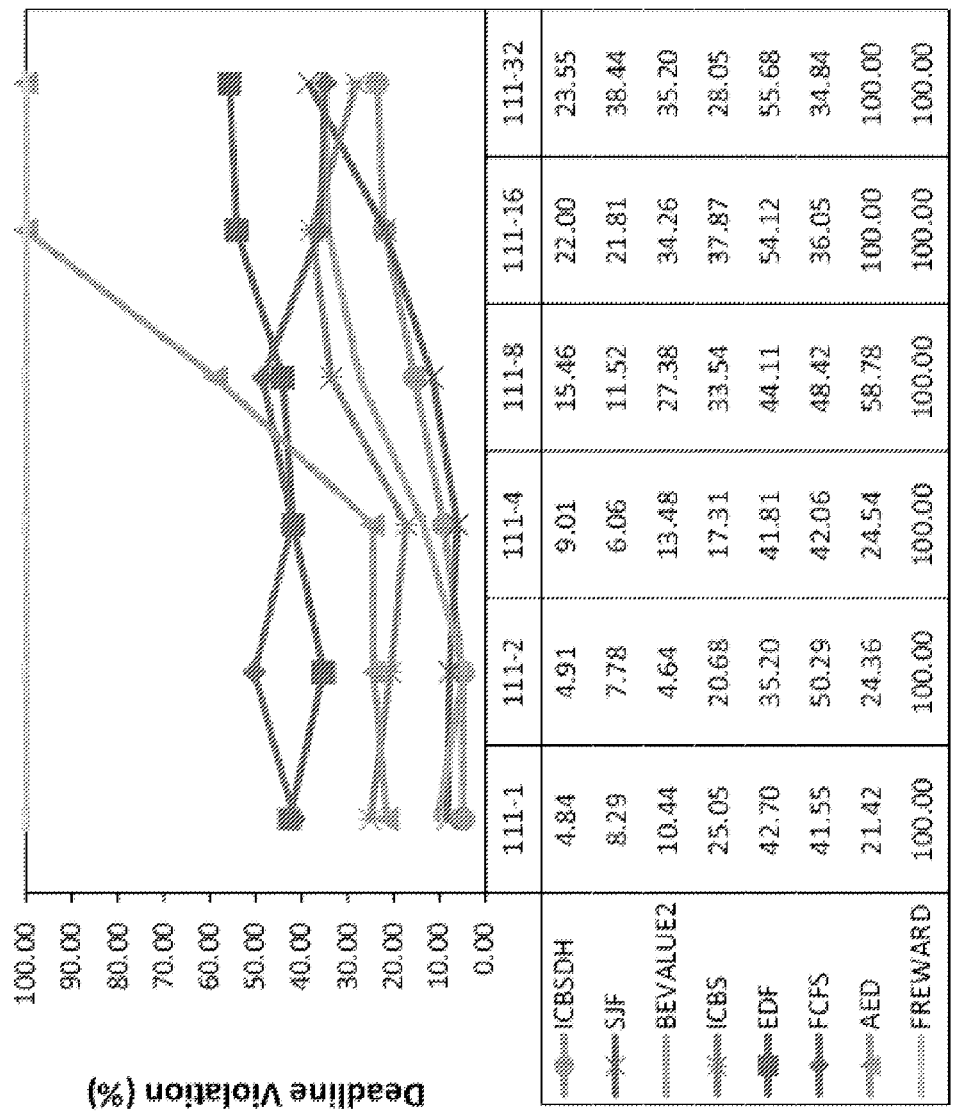
FIG. 9(a) and FIG. 9(b) are graphs depicting the performance of scheduling policies under varying multi-programming level showing a) Deadline violations and b) SLA cost; according to an aspect of the present disclosure.
Figure 9B:
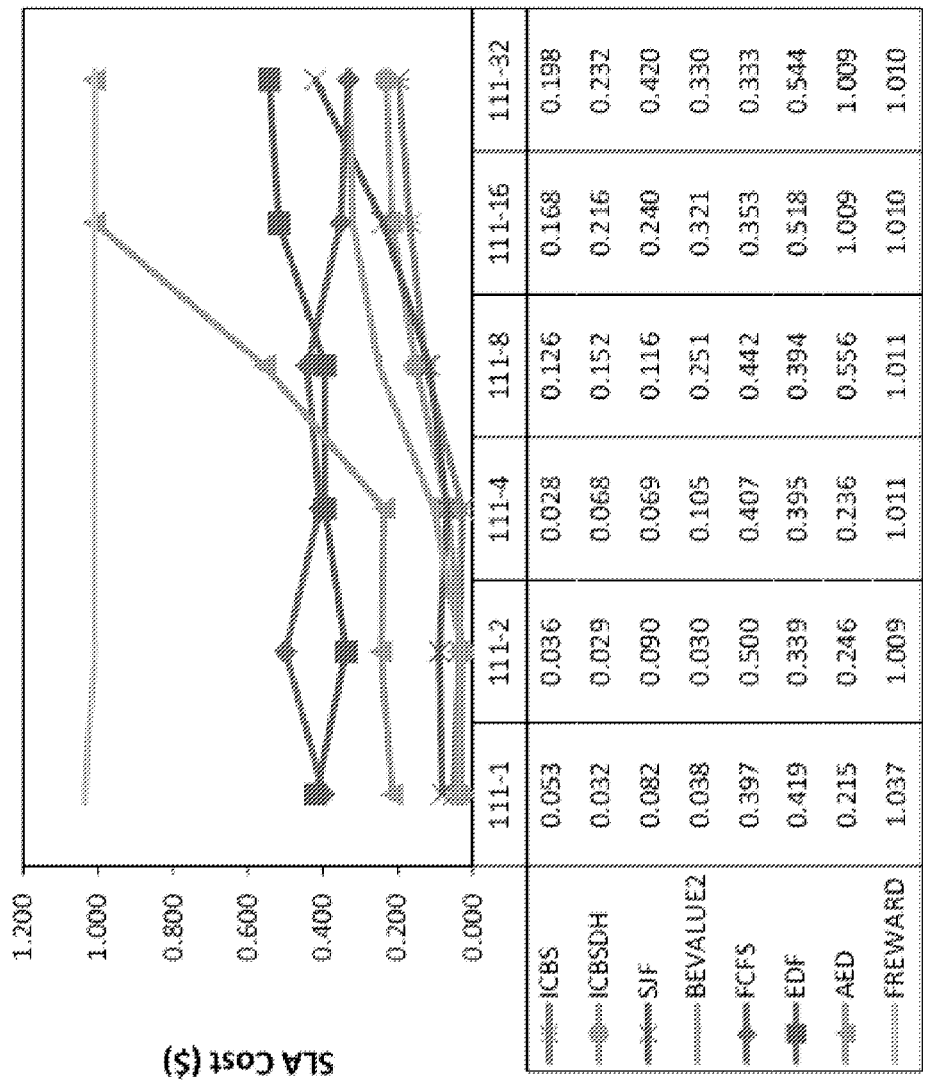

FIGS. 9(a) and 9(b) shows the experiment results. For deadline performance, overall violation generally increases with higher MPL, as average query execution time increases from 0.340 msec (MPL=1) to 1.49 msec (MPL=32), while the deadlines are kept unchanged. iCBS and SJF perform the best in most cases. For cost performance, overall cost increases with higher MPL as well, while iCBS performs the best generally.

5) Varying Query Mix: In previous experiments, we have used Q1 through Q5, where execution times are in the range of 0.23 to 0.54 msec. This resembles the OLTP workloads, where each query is very small, and many such queries are run at high-throughput with high-MPL. In this subsection, we consider OLAP query workload, where some analytical queries may have long execution times (e.g. minutes to hours) and some are still short (e.g. seconds to minutes). We simulate such a query mix with varying execution time, using Q5 and Q6. These queries take 0.54 msec and 158 msec, and may be somewhat small scale, but their 1-to-300 execution time ratio is close to that of typical OLAP query mix. We create the mix using 99.62% of Q5 and 0.38% of Q6, so that each query type contribute about 50% of the total workload.

Figure 10A:
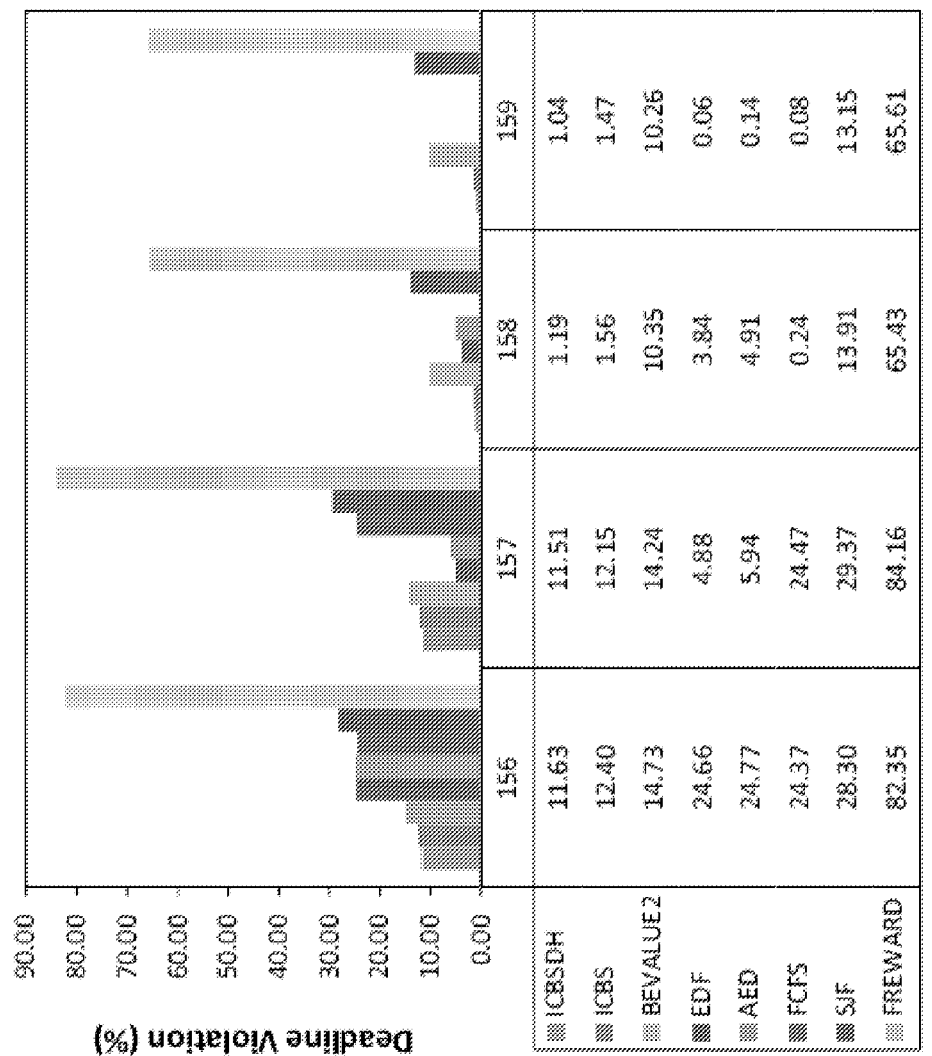
FIG. 10(a) and FIG. 10(b) are graphs depicting the performance of scheduling policies under varying SLA Cost Function and Deadline using short-long query mix showing a) Deadline violations and b) SLA cost; according to an aspect of the present disclosure.
Figure 10B:
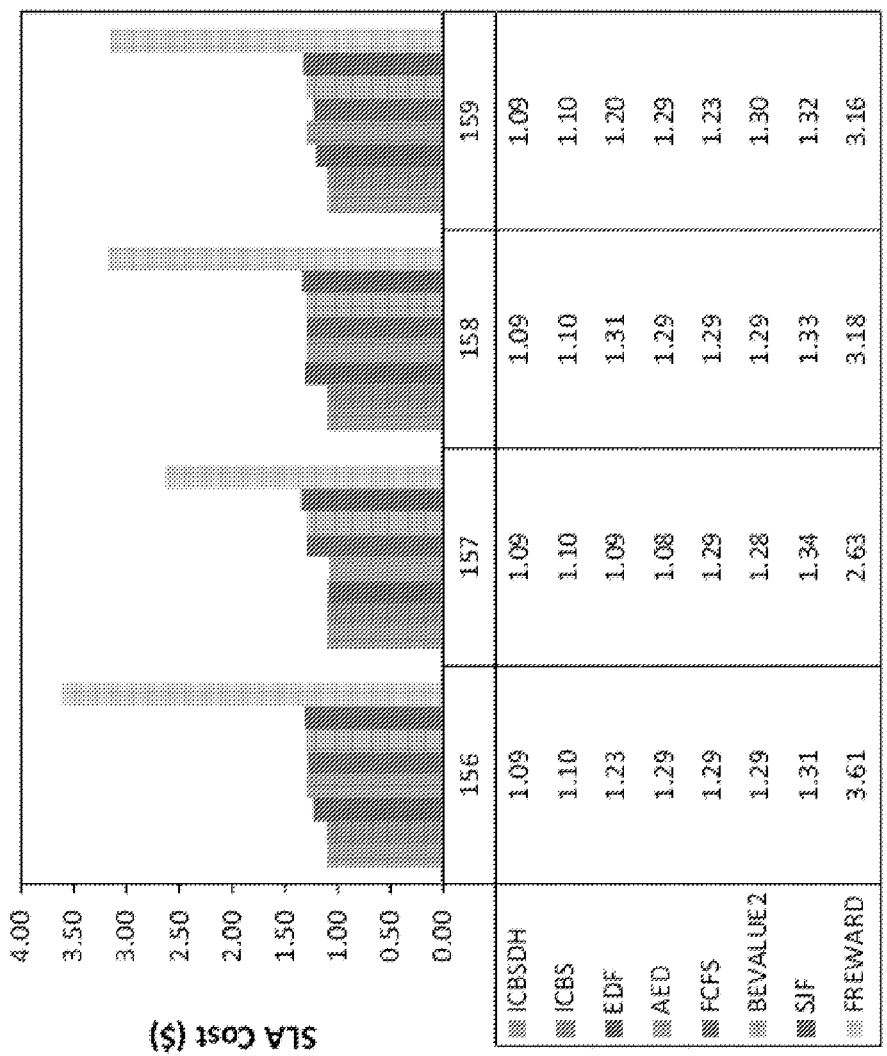

FIGS. 10(a) and 10(b) show the results under SLACost-Dead-lineCode=15x, where deadline code varies between 6 and 9. iCBS-DH and iCBS gives good deadline performance in general. They are, however, outperformed by EDF and AED under the code 157 and 159: under these codes, long-running query Q6 has a cost step at 250 msec and a deadline at 500 msec. iCBS-DH and iCBS schedules some of Q6 for SLA cost reduction at around 250 msec, and causes increase in deadline violation, while EDF and AED do not do this, and just focus on 500 msec deadline, which is a relaxed time budget that leads to lower deadline violation overall. Cost performance displays similar results across various scheduling policies, except FirstReward that suffers from high scheduling overhead mentioned above.

6) Varying Deadline Hint Cost: Lastly, we study the performance behavior of iCBS-DH that we propose in this paper. We consider the impact of hint cost value that suggests how importantly the deadline should be regarded for scheduling decisions. If hint cost value is high, deadline observation will be more stressed than regular SLA cost steps. If hint cost value is low, the opposite will happen. We use the short queries here, i.e. Q1 through Q5.

Figure 11A:
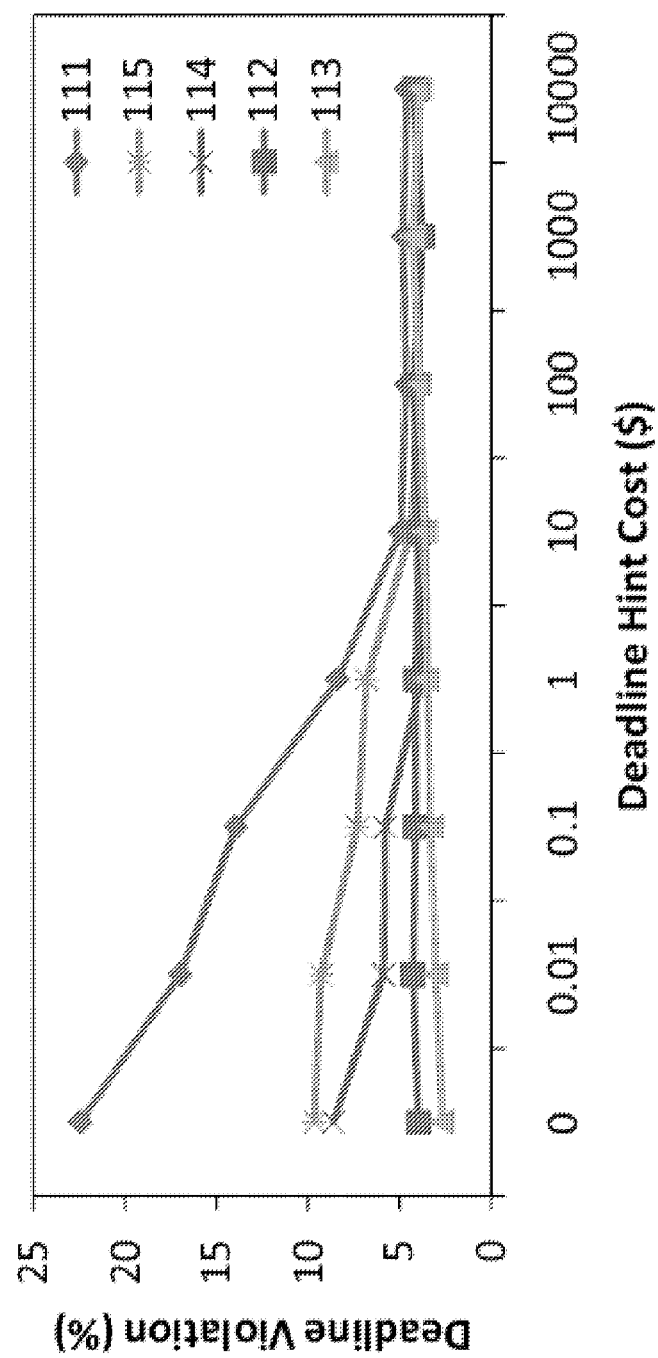
FIG. 11(a) and FIG. 11(b) are graphs depicting the performance of iCBS-DH under varying deadline hint cost ($) showing a) Deadline violation and b) SLA cost; according to an aspect of the present disclosure.
Figure 11B:
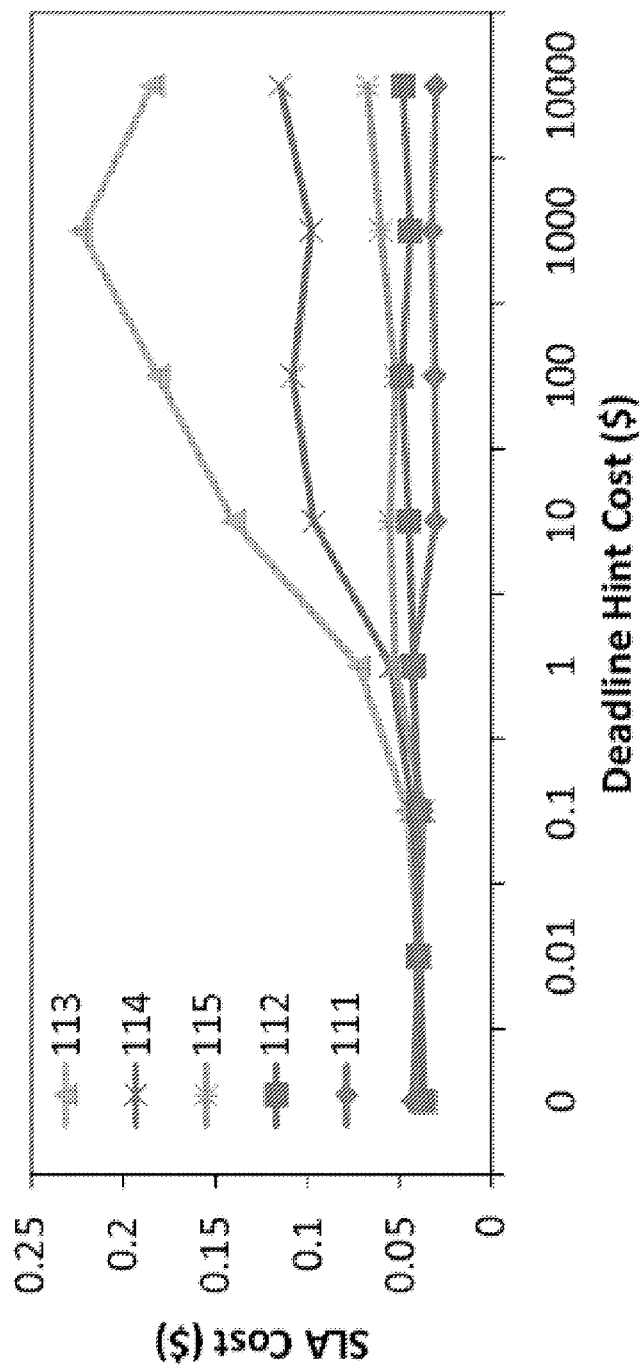

FIGS. 11(a) and 11(b) show the experiment result. We vary hint cost value between 0.01 and 10000. We also show hint=0 case, where it works the same as the regular iCBS. For deadline performance, high hint cost reduces violation and hint=10 or higher performs similarly. Hint=1 slightly increases the violation, while hint value less than that gives a big jump in violation. Hint=1 forms a critical point because regular cost steps in this experiment is in the range of 0.69 and 1.62. Note that some hint cost has different impacts on deadline performance with different SLA cost function shape and deadline: given SLACostDeadlineCode=113 and 112, deadline violation does not change much with low hint cost value, while the violation increases dramatically with low hint cost given query Q6 has a cost step at 250 msec and a deadline at 500 msec. iCBS-DH and iCBS schedules some of Q6 for SLA cost reduction at around 250 msec, and causes increase in deadline violation, while EDF and AED do not do this, and just focus on 500 msec deadline, which is a relaxed time budget that leads to lower deadline violation overall. Cost performance displays similar results across various scheduling policies, except FirstReward that suffers from high scheduling overhead mentioned above.

6) Varying Deadline Hint Cost: Lastly, we study the performance behavior of iCBS-DH that we propose in this paper. We consider the impact of hint cost value that suggests how importantly the deadline should be regarded for scheduling decisions. If hint cost value is high, deadline observation will be more stressed than regular SLA cost steps. If hint cost value is low, the opposite will happen. We use the short queries here, i.e. Q1 through Q5.

FIGS. 11(a) and 11(b) shows the experiment result. We vary hint cost value between 0.01 and 10000. We also show hint=0 case, where it works the same as the regular iCBS. For deadline performance, high hint cost reduces violation and hint=10 or higher performs similarly. Hint=1 slightly increases the violation, while hint value less than that gives a big jump in violation. Hint=1 forms a critical point because regular cost steps in this experiment is in the range of 0.69 and 1.62. Note that some hint cost has different impacts on deadline performance with different SLA cost function shape and deadline: given SLACostDeadlineCode=113 and 112, deadline violation does not change much with low hint cost value, while the violation increases dramatically with low hint cost given 114, 115, and 111. This is because under the code 112 and 113, deadline is the same as or later than the SLA cost step, so the iCBSh-DH's cost minimization based on iCBS keeps the deadline violation low even without strong deadline hint. As expected, cost performance gets worse with higher hint cost value. With hint cost value 0.1 or 0.01, iCBS-DH performs very similar to iCBS, and hint=1 gives a slight rise in the cost. Hint of 10 or higher makes the cost much higher compared to that of iCBS. Again, different SLACostDeadlineCode shows different curve with high hint cost. This is because, with SLACostDeadlineCode=113, emphasis on the deadline (i.e. 30 msec after arrival) means the less attention on the cost step (i.e. 20 msec after arrival), leading to high SLA cost. In other cases, e.g. 111, 112, 115, emphasis on the deadline doesn't hurt the cost given the SLA cost function and deadline.

It seems that iCBS-DH makes a good tradeoff between deadline violation and cost minimization with hint value.

Hint value set at the average cost step seems to sacrifice both deadline and cost performance mildly. With the high priority on one metric, one may lose somewhat on the other metric, but from our previous experiments, the loss is also reasonably well controlled in most cases class must share the same utility function.

Figure 12:
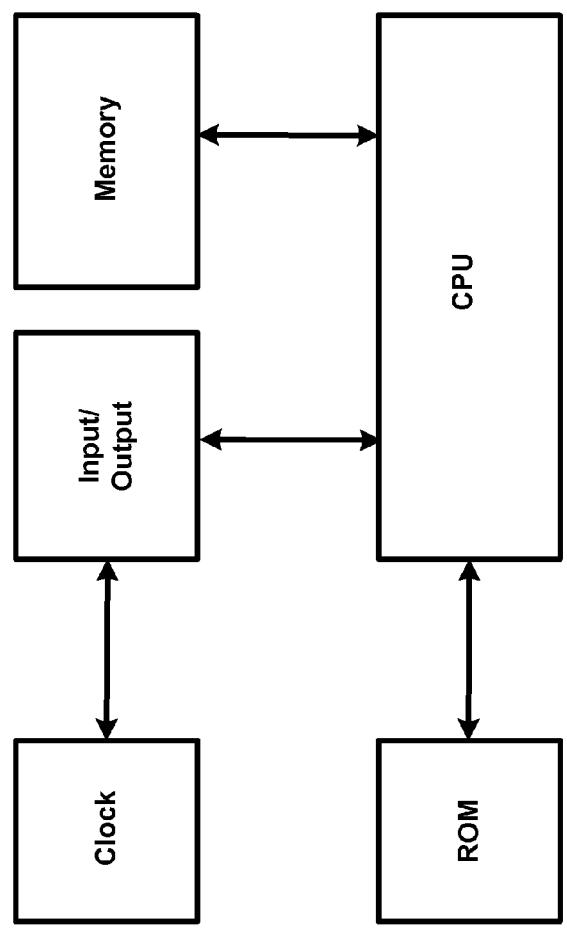
FIG. 12 is a schematic diagram depicting an exemplary computing system that may operate a method receiver according to an aspect of the present disclosure.

Finally, FIG. 12 is a schematic block diagram depicting a representative computer system upon which methods according to the present disclosure may operate. In presenting our methods, we have employed some specific examples. Those skilled in the art will appreciate that this disclosure is not so specifically limited. Accordingly, it should be limited only by the claims herein.

The invention claimed is:

1. A computer implemented method for computer workload scheduling comprising:

receiving with a processor a job along with a service level agreement (SLA) cost function, a deadline and an importance indication of the deadline wherein the SLA cost function includes both a revenue function $R(x)$ and an SLA penalty cost function $C(x)$ defined by $$C(x)=R_0-R(x);$$

where $R_0$ is the maximum revenue possible under the SLA;

determining a cost based scheduling policy (CBS) priority for job i as:

$$p_i(t)\int_0^\infty a(\tau) \cdot c_i(t+\tau)dt - c_i(t)$$

where $c(t)$ is a cost, $\tau$ is a wait time and $a(\tau)$ is an exponential function;

determining a cost of a deadline hint from the deadline importance wherein a high hint cost is associated with a strict deadline observation and a low hint cost is associated with a deadline observation that is not strict, where a high hint cost makes the deadline a high priority and vice versa;

determining a new cost wherein the new cost is the sum of the service level agreement cost and the deadline hint cost;

scheduling the job through the effect of a cost based scheduler wherein the cost based scheduler uses the new cost as input to schedule the job; and executing the job so scheduled on the computer.

* * * * *